United States Patent
Kim et al.

(10) Patent No.: US 11,230,622 B2
(45) Date of Patent: Jan. 25, 2022

(54) HIGH CIS-1,4 BLOCK COPOLYMERS OF POLYBUTADIENE AND POLYISOPRENE

(71) Applicant: Bridgestone Corporation, Chuo-ku (JP)

(72) Inventors: Hyeonjae Kim, Hudson, OH (US); Walter A. Salamant, Akron, OH (US); Noriaki Yukimura, Chuo-ku (JP); Steven Luo

(73) Assignee: Bridgestone Corporation, Chuo-ku (JP)

( * ) Notice: Subject to any disclaimer, the term of this patent is extended or adjusted under 35 U.S.C. 154(b) by 126 days.

(21) Appl. No.: 16/348,780

(22) PCT Filed: Nov. 9, 2017

(86) PCT No.: PCT/US2017/060863
§ 371 (c)(1),
(2) Date: May 9, 2019

(87) PCT Pub. No.: WO2018/089635
PCT Pub. Date: May 17, 2018

(65) Prior Publication Data
US 2019/0359755 A1 Nov. 28, 2019

Related U.S. Application Data

(60) Provisional application No. 62/419,575, filed on Nov. 9, 2016.

(51) Int. Cl.
| | | |
|---|---|---|
| *C08F 297/02* | (2006.01) | |
| *C08F 293/00* | (2006.01) | |
| *C08K 3/04* | (2006.01) | |
| *C08L 53/00* | (2006.01) | |
| *B60C 1/00* | (2006.01) | |
| *B60C 11/00* | (2006.01) | |
| *C08F 4/54* | (2006.01) | |
| *C08F 4/42* | (2006.01) | |
| *C08L 9/00* | (2006.01) | |

(52) U.S. Cl.
CPC .......... *C08F 297/02* (2013.01); *B60C 1/0016* (2013.01); *B60C 1/0025* (2013.01); *B60C 11/0008* (2013.01); *C08F 4/42* (2013.01); *C08F 4/545* (2013.01); *C08F 293/005* (2013.01); *C08K 3/04* (2013.01); *C08L 53/00* (2013.01); *B60C 2011/0025* (2013.01); *C08F 2438/03* (2013.01); *C08L 9/00* (2013.01)

(58) Field of Classification Search
CPC ...... C08F 297/02; C08F 293/005; C08K 3/04; C08L 53/00; B60C 1/0025; B60C 11/0008; B60C 1/0016; B60C 2011/0025
See application file for complete search history.

(56) References Cited

U.S. PATENT DOCUMENTS

| | | |
|---|---|---|
| 3,352,944 A | 11/1967 | Wheat |
| 3,772,256 A | 11/1973 | Nudenberg et al. |
| 3,985,826 A | 10/1976 | Futamura |
| 4,413,098 A | 11/1983 | Hattori et al. |
| 4,843,120 A | 6/1989 | Halasa et al. |
| 5,075,377 A | 12/1991 | Kawabuchi et al. |
| 5,229,464 A | 7/1993 | Erickson |
| 5,382,604 A | 1/1995 | Erickson |
| 6,070,634 A | 6/2000 | Sandstrom et al. |
| 6,184,307 B1 | 2/2001 | Schisla |
| 6,355,728 B1 | 3/2002 | Kawazura et al. |
| 6,703,448 B2 | 3/2004 | Pierre et al. |
| 6,992,147 B1 | 1/2006 | Ozawa et al. |
| 7,750,087 B2 | 7/2010 | Ozawa et al. |
| 8,017,695 B2 | 9/2011 | Luo et al. |
| 9,303,154 B2 | 4/2016 | Chen et al. |
| 2005/0261439 A1 | 11/2005 | Stere et al. |
| 2006/0030677 A1 | 2/2006 | Ozawa et al. |
| 2008/0182954 A1* | 7/2008 | Luo ................... B60C 1/0025 526/221 |
| 2015/0166707 A1 | 6/2015 | Lee et al. |
| 2015/0232602 A1 | 8/2015 | Tamaki et al. |
| 2017/0233504 A1 | 8/2017 | Yamagata et al. |
| 2017/0335032 A1 | 11/2017 | Mccauley et al. |

FOREIGN PATENT DOCUMENTS

| | | |
|---|---|---|
| CN | 104428332 | 3/2015 |
| CN | 104558451 | 4/2015 |
| EP | 0091278 A1 | 10/1983 |
| EP | 1939221 A2 | 7/2008 |
| EP | 2289992 A1 | 3/2011 |
| JP | 2002-12702 A | 1/2002 |
| JP | 2006-509898 A | 3/2006 |
| JP | 2009-73849 A | 4/2009 |
| JP | 2010-121116 A | 6/2010 |

(Continued)

OTHER PUBLICATIONS

International Search Report dated Feb. 13, 2018 for corresponding PCT/US2017/060863.

(Continued)

*Primary Examiner* — Robert D Harlan
(74) *Attorney, Agent, or Firm* — Meredith E. Hooker; Arthur M. Reginelli

(57) ABSTRACT

A vulcanizable composition comprising rubber component, a filler, and a curing agent, where the rubber component includes a block copolymer of polybutadiene and polyisoprene, and where the block copolymer has a cis content of at least 90%.

22 Claims, 1 Drawing Sheet

(56) References Cited

FOREIGN PATENT DOCUMENTS

| RU | 2522568 C2 | 2/2013 |
| WO | 97/40053 A1 | 4/1997 |
| WO | 2004/055070 A1 | 7/2004 |
| WO | 2009/151103 A1 | 12/2009 |
| WO | 2016027402 | 2/2016 |
| WO | 2016-081300 A1 | 5/2016 |

OTHER PUBLICATIONS

Hsieh H. et al., Polymerization of Butadiene and Isoprene with Lanthanide Catalysts; Characterization and Properties of Homopolymers and Copolymers, Rubber Chemistry and Technology, 1985, v. 58, No. 1, p. 117-145.
Extended European Search Report dated Apr. 29, 2020 for related European Application 17869534 (PCT/US2017/060863), (EPO transmittal date May 26, 2020).
Database WPI Week 200231, Thompson Scientific, London.
Aihua, He, et al. "Synthesis of a High-Trans 1,4-Butadiene/Isoprene Copolymers with Supported Titanium Catalysts" Journal of Applied Polymer Science, vol. 89, No. 7, Aug. 15, 2003 (pp. 1800-1807).
Official Action for related Japanese Application No. 2019-545907 (pp. 1-6) (Japanese language).
Office Action in China application No. 201780079108.6; dated Apr. 7, 2021.

\* cited by examiner

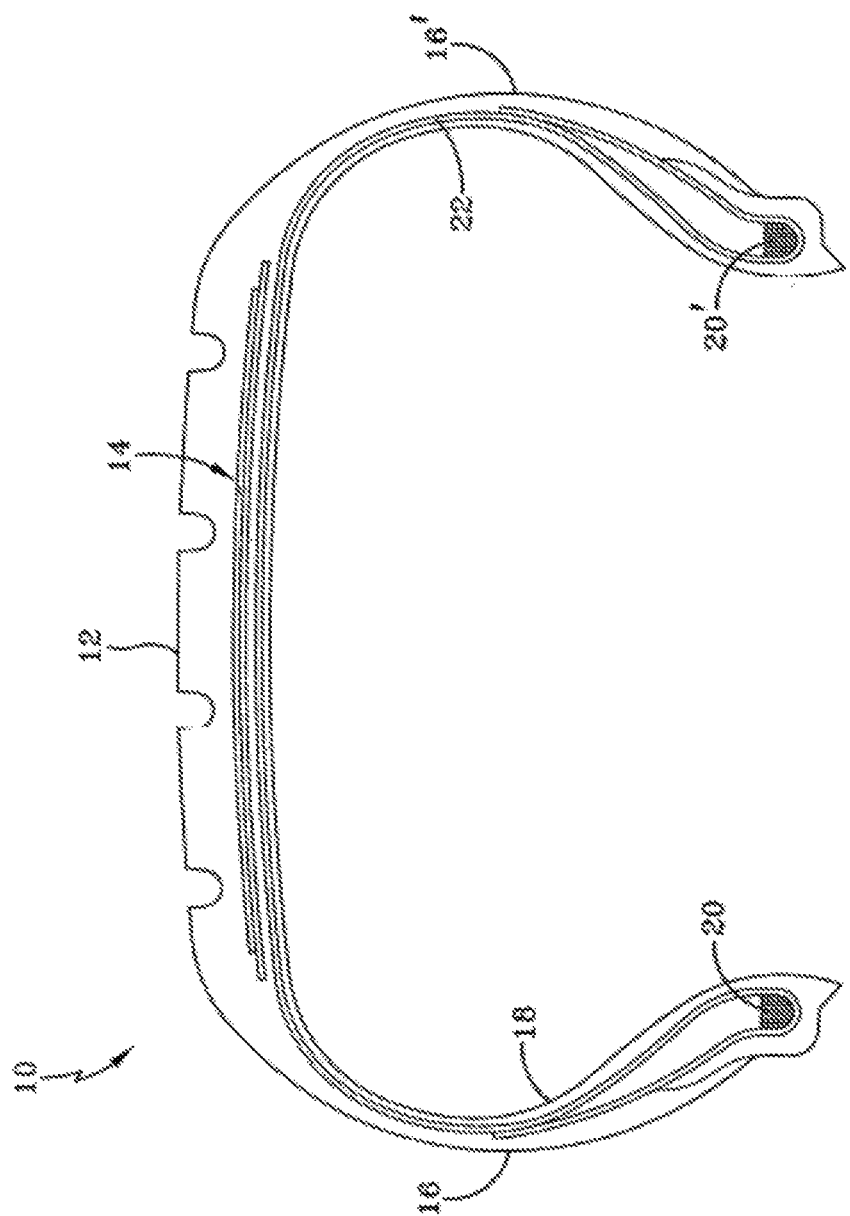

HIGH CIS-1,4 BLOCK COPOLYMERS OF POLYBUTADIENE AND POLYISOPRENE

This application is a National-Stage application of PCT/US2017/060863 filed on Nov. 9, 2017, which claims the benefit of U.S. Provisional Application Ser. No. 62/419,575 filed on Nov. 9, 2016, which are incorporated herein by reference.

FIELD OF THE INVENTION

Background of the Invention

Block copolymers are commonly used in the rubber industry. For example, a block copolymer may be used as a compatibilizer for two immiscible polymers. Typically, block copolymers are prepared using anionic polymerization techniques. Polymers prepared with anionic initiators display living characteristics in that the polymer chains possess living ends that are capable of reacting with additional monomer for further chain growth. While anionic polymerization can readily produce block copolymers, the process does not provide strict control over the polymer microstructure, and as a result the polymers typically have a low or a medium cis-1,4-linkage content.

Polymers with a high cis-1,4-linkage content have a low glass transition temperature (Tg), which provides good low-temperature properties. Also, high 1,4-cis polymers have excellent wear resistance and mechanical properties such as reduced cut growth. Coordination-catalysis techniques allow for better control of the polymer microstructure and may be used to prepare polymers with a high cis-1,4-linkage content. In some situations, polymers prepared by coordination catalysts have been found to demonstrate some living characteristics and have therefore been referred to as pseudo-living polymers. Coordination polymerization is complicated and not well understood, but is believed to operate by chemical mechanisms that involve the interaction of several chemical constituents, and often also involve self-termination reactions. Among these chemical constituents are reactants that cause a chain transfer mechanism. As a result, reaction conditions suitable for preparing block copolymers using a coordination catalyst are difficult to obtain.

Lanthanide-based catalysts are particularly useful coordination catalysts for the production of polydienes for the tire industry. The cis-1,4-polydienes produced with lanthanide-based catalyst systems typically have a linear backbone, which is believed to provide better tensile properties, higher abrasion resistance, lower hysteresis, and better fatigue resistance as compared to the cis-1,4-polydienes prepared with other catalyst systems such as titanium-, cobalt-, and nickel-based catalyst systems. Therefore, the cis-1,4-polydienes made with lanthanide-based catalysts are particularly suitable for use in tire components such as sidewalls and treads.

SUMMARY OF THE INVENTION

One or more embodiments of the present invention provide a vulcanizable composition comprising rubber component, a filler, and a curing agent, where the rubber component includes a block copolymer of polybutadiene and polyisoprene, and where the block copolymer has a cis content of at least 90%.

Still other embodiments of the present invention provide a tire component prepared from a vulcanizable composition comprising rubber component, a filler, and a curing agent, where the rubber component includes a block copolymer of polybutadiene and polyisoprene, and where the block copolymer has a cis content of at least 90%.

Yet other embodiments of the present invention provide a method of preparing a high 1,4-cis block copolymers of polybutadiene and polyisoprene comprising (i) forming a polymerization mixture that includes a pseudo-living polymer by combining a first monomer and a lanthanide-based catalyst, where the lanthanide-based catalyst comprises (a) a lanthanide-containing compound, (b) an aluminoxane, (c) an organoaluminum compound defined by the formula AlRnX3-n, where each R is individually a hydrocarbon group or a substituted hydrocarbon group, each X is individually a hydrogen atom, a carboxylate group, an alkoxide group, or an aryloxide group, and where n is an integer of 1 to 3, and (d) a halogen-containing compound; (ii) adding a second monomer to the polymerization mixture that includes a pseudo-living polybutadiene polymer, and where the first monomer is either 1,3-butadiene or isoprene and the second monomer is not the same as the first monomer and either 1,3-butadiene or isoprene.

Other embodiments of the present invention provide a method of preparing a high 1,4-cis block copolymer of polybutadiene and polyisoprene comprising (i) polymerizing 1,3-butadiene with a lanthanide-based catalyst to form a pseudo-living polymer, where the lanthanide-based catalyst comprises (a) a lanthanide-containing compound, (b) an aluminoxane, (c) an organoaluminum compound defined by the formula $AlR_nX_{3-n}$, where each R is individually a hydrocarbon group or a substituted hydrocarbon group, each X is individually a hydrogen atom, a carboxylate group, an alkoxide group, or an aryloxide group, and where n is an integer of 1 to 3, and (d) a halogen-containing compound; (ii) reacting the pseudo-living polymer with isoprene.

BRIEF DESCRIPTION OF THE DRAWINGS

FIG. 1 is a cross-sectional view of a tire according to one or more embodiments of this invention.

DETAILED DESCRIPTION OF ILLUSTRATIVE EMBODIMENTS

Embodiments of the present invention are based, at least in part, on the discovery of high cis-1,4-polydiene block copolymers of polybutadiene and polyisoprene. The block copolymers have unexpectedly been found to exhibit an advantageous balance of wear resistance and lower hysteretic loss when vulcanized alone or in the presence of other elastomers. Advantageously, these copolymers may be produced using lanthanide-based catalyst systems that include alkylating agents that serve as chain transfer agents, which allows the polymerization process to be commercially viable. While the presence of chain transfer agents has presented technical challenges when block copolymers are desired, it has now unexpectedly been discovered that the inclusion of an aluminoxane cocatalyst advantageously allows for block copolymerization of conjugated dienes (e.g., 1,3-butadiene and isoprene).

Polymer Characteristics

Block copolymers include those polymers that have two or more blocks, where a block includes repeating mer units that are compositionally the same. For example, diblock polymers include A-B-type block copolymers that may be prepared by polymerizing a first monomer (e.g. butadiene) to produce a first block and then polymerizing a second monomer (e.g. isoprene) to produce a second block that is tethered to the first block. Multiblock copolymers may also be prepared by adding subsequent additions of the first monomer or a third monomer (i.e., a third conjugated diene). In yet other embodiments, the first or second monomer may be added after a distinct monomer is polymerized to provide repeating blocks (e.g. produce an A-B-A or A-B-A-B block copolymer). In one specific example, a diblock copolymer may be prepared as described above, and after suitable amount of the second monomer has been polymerized, the first monomer may be added to prepare a triblock or A-B-A-type block copolymer. Successive blocks may then be added by alternating additions of the first and second monomer.

In one or more embodiments, the block copolymer may include a tapered section that includes both isoprene and butadiene units. In certain embodiments, the tapered section is minimized; in other words, the block copolymer includes less than 5% by weight, more preferably less than 3% by weight, and even more preferably less than 1% by weight of a tapered section. In other embodiments, the block copolymer is devoid of a tapered section.

In one or more embodiments, the block copolymers may be characterized by their polymer microstructure. For example, where the block copolymer includes a block copolymer including a block of polybutadiene and a block of polyisoprene, the polymer microstructure of the polybutadiene and polyisoprene blocks may be determined separately by $^{13}$C NMR. In one or more embodiments, these block copolymers may include polybutadiene segments or blocks having a cis-1,4-linkage content that is greater than 60%, in other embodiments greater than 75%, in other embodiments greater than 90%, in other embodiments greater than 95%, in other embodiments greater than 96%, in other embodiments greater than 97%, and in other embodiments greater than 98%, where the percentages are based upon the number of butadiene mer units adopting the cis-1,4 linkage versus the total number of butadiene mer units. In these or other embodiments, the block copolymers may include polybutadiene segments or blocks having a cis-1,4-linkage content that is less than 100%, and in other embodiments less than 99%. Also, the block copolymers may include polybutadiene segments or blocks having a 1,2-linkage content that is less than 7%, in other embodiments less than 5%, in other embodiments less than 2%, and in other embodiments less than 1%, where the percentages are based upon the number of butadiene mer units adopting the cis-1,4 linkage versus the total number of butadiene mer units. The balance of the butadiene mer units within the block may adopt the trans-1,4-linkage.

In one or more embodiments, these block copolymers may include polyisoprene segments or blocks having a cis-1,4-linkage content that is greater than 60%, in other embodiments greater than 75%, in other embodiments greater than 90%, in other embodiments greater than 95%, in other embodiments greater than 96%, in other embodiments greater than 97%, and in other embodiments greater than 98%, where the percentages are based upon the number of butadiene mer units adopting the cis-1,4 linkage versus the total number of isoprene mer units. In these or other embodiments, the block copolymers may include polyisoprene segments or blocks having a cis-1,4-linkage content that is less than 100%, and in other embodiments less than 99%. Also, the block copolymers may include polyisoprene segments or blocks having a 3,4-vinyl linkage content that is less than 6%, in other embodiments less than 5%, in other embodiments less than 4%, and in other embodiments less than 2%, where the percentages are based upon the number of isoprene mer units adopting the 3,4-vinyl linkage versus the total number of isoprene mer units. The balance of the isoprene mer units within the block may primarily adopt the trans-1,4-linkage with a small amount adopting 1,2-vinyl linkage.

In one or more embodiments, these block copolymer may be characterized by the ratio of the amount polybutadiene to polyisoprene, which may be determined by $^{13}$C NMR. In one or more embodiments, the ratio of polybutadiene to polyisoprene may be from about 90:10 to about 10:90, in other embodiments about 80:20 to about 20:80, in other embodiments about 25:75 to about 75:25, in other embodiments about 30:70 to about 70:30, in other embodiments about 35:65 to about 65:35, and in other embodiments about 40:60 to about 60:40.

In one or more embodiments, the number average molecular weight (Mn) of the block copolymers (e.g. block copolymers of polybutadiene and polyisoprene) of this invention may be from about 1,000 g/mol to about 1,200,000 g/mol, in other embodiments from about 10,000 g/mol to about 1,000,000 g/mol, in other embodiments from about 150,000 g/mol to about 800,000 g/mol, in other embodiments from about 200,000 g/mol to about 600,000 g/mol, and in other embodiments from about 300,000 g/mol to about 500,000 g/mol, as determined by using gel permeation chromatography (GPC) calibrated with polystyrene standards (represented in grams per mole). The molecular weight distribution or polydispersity (Mw/Mn) of the high 1,4-cis polydiene block copolymers of this invention may be from about 1.5 to about 5.0, and in other embodiments from about 2.0 to about 4.0. In these or other embodiments, the high 1,4-cis polydiene block copolymers of this invention may have a Mw/Mn of less than 3.5, in other embodiments less than 3.0, in other embodiments less than 2.5, in other embodiments less than 2.3, in other embodiments less than 2.2, and in other embodiments less than 2.0.

In one or more embodiments, the block copolymers of this invention may be characterized by the number average molecular weight (Mn) of the polybutadiene block or segment, which may be determined using gel permeation chromatography (GPC) calibrated with polystyrene standards and calculating the contribution of the polybutadiene block from the polybutadiene to polyisoprene ratio as determined by $^{13}$C NMR. In one or more embodiments, the number average molecular weight (Mn) of the polybutadiene block may be from about 200 g/mol to about 800,000 g/mol, in other embodiments from about 1,000 g/mol to about 600,000 g/mol, in other embodiments from about 10,000 g/mol to about 400,000 g/mol, and in other embodiments from about 50,000 g/mol to about 200,000 g/mol.

In one or more embodiments, the block copolymer may be characterized by the number average molecular weight (Mn) of the polyisoprene block or segment, which may be determined using gel permeation chromatography (GPC) calibrated with polystyrene standards and calculating the contribution of the polyisoprene block from the polybutadiene to polyisoprene ratio as determined by $^{13}$C NMR. In one or more embodiments, the number average molecular weight (Mn) of the polyisoprene block may be from about 200 g/mol to about 800,000 g/mol, in other embodiments from about 1,000 g/mol to about 600,000 g/mol, in other embodiments from about 10,000 g/mol to about 400,000 g/mol, and in other embodiments from about 50,000 g/mol to about 200,000 g/mol.

In one or more embodiments, the block copolymers may contain unsaturation. In these or other embodiments, the block copolymers are vulcanizable. In one or more embodiments, the block copolymers can have two glass transition temperatures (Tg). A polymer with two glass transition temperatures is consistent with a block copolymer, as opposed to a random copolymer, which has a single glass transition temperature. In these or other embodiments, the block copolymers of this invention may have a first glass transition temperature that is between about −80° C. and −40° C., in other embodiments between about −75° C. and −50° C., and in other embodiments between about −70° C. and −60° C. In one or more embodiment, the block copolymers of this invention may have a second glass transition temperature that is between about −125° C. and −85° C., in other embodiments between about −115° C. and −95° C., and in other embodiments between about −110° C. and −100° C.

In one or more embodiments, a functional group may be imparted on the block copolymer chain end by treating the reactive block copolymer with a functionalizing agent. The percentage of polymer chains possessing a functional end group depends on various factors such as the type of catalyst or initiator, the type of monomer, the purity of the ingredients, the polymerization temperature, the monomer conversion, and many other factors. In one or more embodiments, at least about 10% of the polymer chains possess a functional end group, in other embodiments at least about 20% of the polymer chains possess a functional end group, in other embodiments at least about 30% of the polymer chains possess a functional end group, in other embodiments at least about 40% of the polymer chains possess a functional end group, in other embodiments at least about 50% of the polymer chains possess a functional end group, and in still other embodiments at least about 60% of the polymer chains possess a functional end group.

INDUSTRIAL APPLICABILITY

Advantageously, the block copolymers of this invention are particularly useful in preparing rubber compositions that can be used to manufacture tire components. Rubber compounding techniques and the additives employed therein are generally disclosed in *The Compounding and Vulcanization of Rubber*, in *Rubber Technology* (2$^{nd}$ Ed. 1973). The rubber compositions, which may also be referred to as vulcanizable compositions, may include a rubber component, filler, and curing agent. In one or more embodiments, the rubber compositions may include other constituents including, but not limited to, cure activators, cure accelerators, oils, resins, other plasticizers, pigments, cord adhesion promotors, fatty acids, zinc oxide, magnesium oxide, and peptizing agents.

The rubber compositions can be prepared by using the block copolymers alone or together with other elastomers (i.e., polymers that can be vulcanized to form compositions possessing rubbery or elastomeric properties) as the rubber component of the vulcanizable composition. Other elastomers that may be used include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers. In certain embodiments, where another elastomer is employed along with the high 1,4-cis block copolymers of polybutadiene and polyisoprene, the elastomers include only the high 1,4-cis block copolymers of polybutadiene and polyisoprene and a second elastomer.

Exemplary elastomers that may be employed along with the block copolymers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 m$^2$/g and in other embodiments at least 35 m$^2$/g; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc., vol.* 60, p. 309 et seq.) is a recognized method for determining the surface area. The BET surface area of silica is generally less than 450 m$^2$/g. Useful ranges of surface area include from about 32 to about 400 m$^2$/g, about 100 to about 250 m$^2$/g, and about 150 to about 220 m$^2$/g.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

A multitude of rubber curing agents (also called vulcanizing agents or curatives) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization, ENCYCLOPEDIA OF POLYMER SCIENCE AND ENGINEERING*, (2$^{nd}$ Ed. 1989), which are incorporated herein by reference. Vulcanizing agents may be used alone or in combination. The curing agents can also be used in conjunction with co-curatives or other compounds that complement the curing process such as accelerators or inhibitors. In this regard, references may also be made to a cure package.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils. Examples of these oils include paraffinic oils, aromatic oils, naphthenic oils, vegetable oils other than castor oils, and low PCA oils including MES, TDAE, SRAE, heavy naphthenic oils. Since these oils are non-volatile, they typically do not require separation and remain incorporated in the polymer.

In one or more embodiments, the rubber compositions may include a tertiary amine or tertiary amine salt. It has been found that vulcanizates including the block copolymers of this invention and a tertiary amine or tertiary amine salt exhibit advantageous wear resistance while maintaining simultaneously maintaining an advantageous level of hysteretic loss. It is believed that the block copolymers may synergistically interact with the tertiary amine or tertiary amine salt.

In one or more embodiments, the tertiary amine compound may be defined by the formula

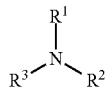

where $R^1$, $R^2$, and $R^3$ are each individually monovalent organic groups. In one or more embodiments, $R^1$, $R^2$, and/or $R^3$ may be a hydrocarbon group with about 8 to about 20 carbon atoms, in other embodiments, from about 10 to about 18 carbon atoms, and in other embodiments from about 12 to about 16 carbon atoms. In these or other embodiments, the hydrocarbon group may be a linear hydrocarbon group. As those skilled in the art will appreciate, a tertiary amine salt may be prepared, for example, by reacting a tertiary amine with an acid. In these or other embodiments, the tertiary amine may include a counter ion, specifically the conjugate base of the acid.

In one or more embodiments, where the tertiary amine is a tertiary amine salt, the tertiary amine salt may include a counter ion. Suitable counter ions include carboxylates, halogen atoms, phosphonates and phosphates. Examples of suitable carboxylates include stearate, citrate and versatate.

Specific examples of tertiary amines include dimethyl octyl amine, dimethyl nonyl amine, dimethyl decyl amine, dimethyl undecyl amine, dimethyl dodecyl amine, dimethyl tridecyl amine, dimethyl tetradecyl amine, dimethyl pentadecyl amine, dimethyl hexadecyl amine, dimethyl eicosyl amine, diethyl octyl amine, diethyl nonyl amine, diethyl decyl amine, diethyl undecyl amine, diethyl dodecyl amine, diethyl tridecyl amine, diethyl tetradecyl amine, diethyl pentadecyl amine, diethyl hexadecyl amine, diethyl eicosyl amine, di-n-propyl octyl amine, di-n-propyl nonyl amine, di-n-propyl decyl amine, di-n-propyl undecyl amine, di-n-propyl dodecyl amine, di-n-propyl tridecyl amine, di-n-propyl tetradecyl amine, di-n-propyl pentadecyl amine, di-n-propyl hexadecyl amine, di-n-propyl eicosyl amine, diisopropyl octyl amine, diisopropyl nonyl amine, diisopropyl decyl amine, diisopropyl undecyl amine, diisopropyl dodecyl amine, diisopropyl tridecyl amine, diisopropyl tetradecyl amine, diisopropyl pentadecyl amine, diisopropyl hexadecyl amine, diisopropyl eicosyl amine, methyl ethyl octyl amine, methyl ethyl nonyl amine, methyl ethyl decyl amine, methyl ethyl undecyl amine, methyl ethyl dodecyl amine, methyl ethyl tridecyl amine, methyl ethyl tetradecyl amine, methyl ethyl pentadecyl amine, methyl ethyl hexadecyl amine, methyl ethyl eicosyl amine, methyl isopropyl octyl amine, methyl isopropyl nonyl amine, methyl isopropyl decyl amine, methyl isopropyl undecyl amine, methyl isopropyl dodecyl amine, methyl isopropyl tridecyl amine, methyl isopropyl tetradecyl amine, methyl isopropyl pentadecyl amine, methyl isopropyl hexadecyl amine, methyl isopropyl eicosyl amine, isopropyl ethyl octyl amine, isopropyl ethyl nonyl amine, isopropyl ethyl decyl amine, isopropyl ethyl undecyl amine, isopropyl ethyl dodecyl amine, isopropyl ethyl tridecyl amine, isopropyl ethyl tetradecyl amine, isopropyl ethyl pentadecyl amine, isopropyl ethyl hexadecyl amine, and isopropyl ethyl eicosyl amine.

Specific examples of tertiary amine salts include dimethyl octyl ammonium stearate, dimethyl nonyl ammonium stearate, dimethyl decyl ammonium stearate, dimethyl undecyl ammonium stearate, dimethyl dodecyl ammonium stearate, dimethyl tridecyl ammonium stearate, dimethyl tetradecyl ammonium stearate, dimethyl pentadecyl ammonium stearate, dimethyl hexadecyl ammonium stearate, dimethyl eicosyl ammonium stearate, diethyl octyl ammonium stearate, diethyl nonyl ammonium stearate, diethyl decyl ammonium stearate, diethyl undecyl ammonium stearate, diethyl dodecyl ammonium stearate, diethyl tridecyl ammonium stearate, diethyl tetradecyl ammonium stearate, diethyl pentadecyl ammonium stearate, diethyl hexadecyl ammonium stearate, diethyl eicosyl ammonium stearate, di-n-propyl octyl ammonium stearate, di-n-propyl nonyl ammonium stearate, di-n-propyl decyl ammonium stearate, di-n-propyl undecyl ammonium stearate, di-n-propyl dodecyl ammonium stearate, di-n-propyl tridecyl ammonium stearate, di-n-propyl tetradecyl ammonium stearate, di-n-propyl pentadecyl ammonium stearate, di-n-propyl hexadecyl ammonium stearate, di-n-propyl eicosyl ammonium stearate, diisopropyl octyl ammonium stearate, diisopropyl nonyl ammonium stearate, diisopropyl decyl ammonium stearate, diisopropyl undecyl ammonium stearate, diisopropyl dodecyl ammonium stearate, diisopropyl tridecyl ammonium stearate, diisopropyl tetradecyl ammonium stearate, diisopropyl pentadecyl ammonium stearate, diisopropyl hexadecyl ammonium stearate, diisopropyl eicosyl ammonium stearate, methyl ethyl octyl ammonium stearate, methyl ethyl nonyl ammonium stearate, methyl ethyl decyl ammonium stearate, methyl ethyl undecyl ammonium stearate, methyl ethyl dodecyl ammonium stearate, methyl ethyl tridecyl ammonium stearate, methyl ethyl tetradecyl ammonium stearate, methyl ethyl pentadecyl ammonium stearate, methyl ethyl hexadecyl ammonium stearate, methyl ethyl eicosyl ammonium stearate, methyl isopropyl octyl ammonium stearate, methyl isopropyl nonyl ammonium stearate, methyl isopropyl decyl ammonium stearate, methyl isopropyl undecyl ammonium stearate, methyl isopropyl dodecyl ammonium stearate, methyl isopropyl tridecyl ammonium stearate, methyl isopropyl tetradecyl ammonium stearate, methyl isopropyl pentadecyl ammonium stearate, methyl isopropyl hexadecyl ammonium stearate, methyl isopropyl eicosyl ammonium stearate, isopropyl ethyl octyl ammonium stearate, isopropyl ethyl nonyl ammonium stearate, isopropyl ethyl decyl ammonium stearate, isopropyl ethyl undecyl ammonium stearate, isopropyl ethyl dodecyl ammonium stearate, isopropyl ethyl tridecyl ammonium stearate, isopropyl ethyl tetradecyl ammonium stearate, isopropyl ethyl pentadecyl ammonium stearate, isopropyl ethyl hexadecyl ammonium stearate, isopropyl ethyl eicosyl ammonium stearate, dimethyl octyl ammonium versatate, dimethyl nonyl ammonium versatate, dimethyl decyl ammonium versatate, dimethyl undecyl ammonium versatate, dimethyl dodecyl ammonium versatate, dimethyl tridecyl ammonium versatate, dimethyl tetradecyl ammonium versatate, dimethyl pentadecyl ammonium versatate, dimethyl hexadecyl ammonium versatate, dimethyl eicosyl ammonium versatate, diethyl octyl ammonium versatate, diethyl nonyl ammonium versatate, diethyl decyl ammonium versatate, diethyl undecyl ammonium versatate, diethyl dodecyl ammonium versatate, diethyl tridecyl ammonium versatate, diethyl tetradecyl ammonium versatate, diethyl pentadecyl ammonium versatate, diethyl hexadecyl ammonium versatate, diethyl eicosyl ammonium versatate, di-n-propyl octyl ammonium versatate, di-n-propyl nonyl ammonium versatate, di-n-propyl decyl ammonium versatate, di-n-propyl undecyl ammonium versatate, di-n-propyl dodecyl ammonium versatate, di-n-propyl tridecyl ammonium versatate, di-n-propyl tetradecyl ammonium versatate, di-n-propyl pentadecyl ammonium versatate, di-n-propyl hexadecyl ammonium versatate, di-n-propyl eicosyl ammonium versatate, diisopropyl octyl ammonium versatate, diisopropyl nonyl ammonium versatate, diisopropyl decyl ammonium versatate, diisopropyl undecyl ammonium versatate, diisopropyl dodecyl ammonium versatate, diisopropyl tridecyl ammonium versatate, diisopropyl tetradecyl ammonium versatate, diisopropyl pentadecyl ammonium versatate, diisopropyl hexadecyl ammonium versatate, diisopropyl eicosyl ammonium versatate, methyl ethyl octyl ammonium versatate, methyl ethyl nonyl ammonium versatate, methyl ethyl decyl ammonium versatate, methyl ethyl undecyl ammonium versatate, methyl ethyl dodecyl ammonium versatate, methyl ethyl tridecyl ammonium versatate, methyl ethyl tetradecyl ammonium versatate, methyl ethyl pentadecyl ammonium versatate, methyl ethyl hexadecyl ammonium versatate, methyl ethyl eicosyl ammonium versatate, methyl isopropyl octyl ammonium versatate, methyl isopropyl nonyl ammonium versatate, methyl isopropyl decyl ammonium versatate, methyl isopropyl undecyl ammonium versatate, methyl isopropyl dodecyl ammonium versatate, methyl isopropyl tridecyl ammonium versatate, methyl isopropyl tetradecyl ammonium versatate, methyl isopropyl pentadecyl ammonium versatate, methyl isopropyl hexadecyl ammonium versatate, methyl isopropyl eicosyl ammonium versatate, isopropyl ethyl octyl ammonium versatate, isopropyl ethyl nonyl ammonium versatate, isopropyl ethyl decyl ammonium versatate, isopropyl ethyl undecyl ammonium versatate, isopropyl ethyl dodecyl ammonium versatate, isopropyl ethyl tridecyl ammonium versatate, isopropyl ethyl tetradecyl ammonium versatate, isopropyl ethyl pentadecyl ammonium versatate, isopropyl ethyl hexadecyl ammonium versatate, and isopropyl ethyl eicosyl ammonium versatate, dimethyl octyl ammonium chloride, dimethyl nonyl ammonium chloride, dimethyl decyl ammonium chloride, dimethyl undecyl ammonium chloride, dimethyl dodecyl ammonium chloride, dimethyl tridecyl ammonium chloride, dimethyl tetradecyl ammonium chloride, dimethyl pentadecyl ammonium chloride, dimethyl hexadecyl ammonium chloride, dimethyl eicosyl ammonium chloride, diethyl octyl ammonium chloride, diethyl nonyl ammonium chloride, diethyl decyl ammonium chloride, diethyl undecyl ammonium chloride, diethyl dodecyl ammonium chloride, diethyl tridecyl ammonium chloride, diethyl tetradecyl ammonium chloride, diethyl pentadecyl ammonium chloride, diethyl hexadecyl ammonium chloride, diethyl eicosyl ammonium chloride, di-n-propyl octyl ammonium chloride, di-n-propyl nonyl ammonium chloride, di-n-propyl decyl ammonium chloride, di-n-propyl undecyl ammonium chloride, di-n-propyl dodecyl ammonium chloride, di-n-propyl tridecyl ammonium chloride, di-n-propyl tetradecyl ammonium chloride, di-n-propyl pentadecyl ammonium chloride, di-n-propyl hexadecyl ammonium chloride, di-n-propyl eicosyl ammonium chloride, diisopropyl octyl ammonium chloride, diisopropyl nonyl ammonium chloride, diisopropyl decyl ammonium chloride, diisopropyl undecyl ammonium chloride, diisopropyl dodecyl ammonium chloride, diisopropyl tridecyl ammonium chloride, diisopropyl tetradecyl ammonium chloride, diisopropyl pentadecyl ammonium chloride, diisopropyl hexadecyl ammonium chloride, diisopropyl eicosyl ammonium chloride, methyl ethyl octyl ammonium chloride, methyl ethyl nonyl ammonium chloride, methyl ethyl decyl ammonium chloride, methyl ethyl undecyl ammonium chloride, methyl ethyl dodecyl ammonium chloride, methyl ethyl tridecyl ammonium chloride, methyl ethyl tetradecyl ammonium chloride, methyl ethyl pentadecyl ammonium chloride, methyl ethyl hexadecyl ammonium chloride, methyl ethyl eicosyl ammonium chloride, methyl isopropyl octyl ammonium chloride, methyl isopropyl nonyl ammonium chloride, methyl isopropyl decyl ammonium chloride, methyl isopropyl undecyl ammonium chloride, methyl isopropyl dodecyl ammonium chloride, methyl isopropyl tridecyl ammonium chloride, methyl isopropyl tetradecyl ammonium chloride, methyl isopropyl pentadecyl ammonium chloride, methyl isopropyl hexadecyl ammonium chloride, methyl isopropyl eicosyl ammonium chloride, isopropyl ethyl octyl ammonium chloride, isopropyl ethyl nonyl ammonium chloride, isopropyl ethyl decyl ammonium chloride, isopropyl ethyl undecyl ammonium chloride, isopropyl ethyl dodecyl ammonium chloride, isopropyl ethyl tridecyl ammonium chloride, isopropyl ethyl tetradecyl ammonium chloride, isopropyl ethyl pentadecyl ammonium chloride, isopropyl ethyl hexadecyl ammonium chloride, and isopropyl ethyl eicosyl ammonium chloride.

In one or more embodiments, the rubber compositions include at least 20, in other embodiments at least 30, and in other embodiments at least 40 percent by weight of the rubber component, based upon the entire weight of the composition. In these or other embodiments, the rubber compositions include at most 90, in other embodiments at most 70, and in other embodiments at most 60 percent by weight of the rubber component based on the entire weight of the composition. In one or more embodiments, the rubber compositions include from about 20 to about 90, in other embodiments from about 30 to about 70, and in other embodiments from about 40 to about 60 percent by weight of the rubber component based upon the entire weight of the composition.

In or more embodiments, the rubber composition may be characterized by the amount of the block copolymer in the total rubber component of the rubber composition. The total rubber component content may be described as the amount by weight of the block copolymer compared to the total weight of the block copolymer and any additional elastomers used in the rubber composition. In one or more embodiments, the rubber composition may include a total rubber component content that is substantially block copolymer. In one or more embodiments, the rubber composition may include a total rubber component content that is at least 50% block copolymer, in other embodiments at least 60% block copolymer, in other embodiments at least 70% block copolymer, in other embodiments at least 80% block copolymer, in other embodiments at least 90%, block copolymer, in other embodiments at least 95% block copolymer, and in other embodiments at least 99%. In one or more embodiment, the rubber composition may include a total rubber component content that is about 50% to about 100% block copolymer, in other embodiments from about 80% to about 99% block copolymer, in other embodiments from about 90% to about 95% block copolymer. In one or more embodiments, the block copolymer is the only elastomer used in the rubber composition.

In one or more embodiments, the total amount of filler employed in the rubber compositions may include at least 5, in other embodiments at least 10, in other embodiments at least 25, and in other embodiments at least 40 parts by weight per 100 parts by weight of rubber (phr). In these or other embodiments, the total amount of filler employed in the rubber compositions may include at most 200, in other embodiments at most 120, in other embodiments at most 60 phr, and in other embodiments at most 50 phr. In one or more embodiments, the total amount of filler employed in the rubber compositions may include from about 5 to about 200, in other embodiments from about 10 to about 50, in other embodiments from about 25 to about 120, and in other embodiments from about 40 to about 60 phr.

In one or more embodiments, the rubber compositions include at least 0, in other embodiments at least 10, and in other embodiments at least 20 parts by weight (pbw) of carbon black per 100 parts by weight rubber (phr). In these or other embodiments, the rubber composition includes at most 200, in other embodiments at most 100, and in other embodiments at most 70 pbw of carbon black phr. In one or more embodiments, the rubber composition includes from about 0 to about 200, in other embodiments from about 10 to about 100, and in other embodiments from about 20 to about 70 pbw of carbon black phr.

In one or more embodiments, the rubber compositions include at least 5, in other embodiments at least 25, and in other embodiments at least 50 parts by weight (pbw) silica per 100 parts by weight rubber (phr). In these or other embodiments, the rubber composition includes at most 200, in other embodiments at most 130, and in other embodiments at most 80 pbw of the silica phr. In one or more embodiments, the rubber composition includes from about 5 to about 200, in other embodiments from about 25 to about 130, and in other embodiments from about 50 to about 80 pbw of silica phr.

In one or more embodiments, the rubber compositions include at least 1, in other embodiments at least 2, and in other embodiments at least 5 parts by weight (pbw) silica coupling agent per 100 parts by weight silica. In these or other embodiments, the rubber composition includes at most 20, in other embodiments at most 15, and in other embodiments at most 10 pbw of the silica coupling agent per 100 parts by weight silica. In one or more embodiments, the rubber composition includes from about 1 to about 20, in other embodiments from about 2 to about 15, and in other embodiments from about 5 to about 10 pbw of silica coupling agent per 100 parts by weight silica.

In one or more embodiments, the rubber compositions include at least 0, in other embodiments at least 5, and in other embodiments at least 7 parts by weight (pbw) silica dispersing agent per 100 parts by weight silica. In these or other embodiments, the rubber composition includes at most 20, in other embodiments at most 16, and in other embodiments at most 12 pbw of the silica dispersing agent per 100 parts by weight silica. In one or more embodiments, the rubber composition includes from about 0 to about 20, in other embodiments from about 5 to about 16, and in other embodiments from about 7 to about 12 pbw of silica dispersing agent per 100 parts by weight silica.

In one or more embodiments, the rubber compositions include at least 0, in other embodiments at least 10, and in other embodiments at least 20 parts by weight (pbw) oil per 100 parts by weight rubber (phr). In these or other embodiments, the rubber composition includes at most 35, in other embodiments at most 25, and in other embodiments at most 20 pbw of the oil phr. In one or more embodiments, the rubber composition includes from about 0 to about 35, in other embodiments from about 0 to about 25, and in other embodiments from about 0 to about 20 pbw of oil phr.

The block copolymers may be particularly useful in tread compositions for a truck or bus tire (TBR). In one or more embodiments, where the rubber combustion is employed for use in tread for a TBR, the rubber composition includes from about 10 to about 100, in other embodiments from about 20 to about 80, and in other embodiments from about 30 to about 65 pbw of carbon black phr. In these or other embodiments, the rubber composition includes from about 0 to about 20, in other embodiments from about 0 to about 15, and in other embodiments from about 0 to about 10 pbw of oil phr. In these or other embodiments, the rubber composition includes from about 0 to about 100, in other embodiments from about 0 to about 70, and in other embodiments from about 0 to about 35 pbw of silica phr.

The amount of tertiary amine or tertiary amine salt employed in the rubber compositions may be described in terms of parts by weight per 100 parts by weight of rubber (phr). In one or more embodiments, the amount of tertiary amine or tertiary amine salt employed in the rubber compositions may be at least 1 part by weight, in other embodiments at least 2 parts by weight, and in other embodiments, at least 2.5 parts by weight, per 100 parts by weight of rubber (phr). In these or other embodiments, the amount of tertiary amine or tertiary amine salt employed in the rubber compositions may be at most 10 parts by weight, in other embodiments at most 7.5 parts by weight, and in other embodiments, at most 5 parts by weight, per 100 parts by weight of rubber (phr). In one or more embodiments, the amount of tertiary amine or tertiary amine salt employed in the rubber compositions may be from about 1 part to about 10 parts by weight, in other embodiments from about 2 parts to about 7.5 parts by weight, and in other embodiments, from about 2.5 parts to about 5 parts by weight, per 100 parts by weight of rubber (phr).

Process for Manufacturing a Tire

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler (and optionally a tertiary amine or tertiary amine salt), is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer of this invention and silica in the substantial absence of coupling agents and shielding agents.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanization product, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

The rubber compositions prepared from the block copolymers useful for forming tire components. In one or more embodiments, aspects of the invention can be described with reference to FIG. 1. As specifically shown in FIG. 1, tire 10 includes a tread portion 12, a belt package 14, which may include a plurality of belts (not shown), a pair of sidewalls 16, 16' an inner liner 18, and a pair of axially spaced bead portions 20, 20'. Ply 22 extends between bead portions 20, 20'. Truck and bus tires (TBR) generally have a have a belt package 14, that includes more belts than a passenger tire (PSR). As the skilled person will appreciate, tire 10 may also include various other components, which are not shown, such as, but not limited to, tread shoulders, cap plies, belt wedges, and belt shoulders. Suitable tire components that may be prepared from the block copolymers include tire treads.

Synthesis of Cis-1,4 Block Copolymers

In one or more embodiments, high cis-1,4-polydiene block copolymers may be prepared by the sequential polymerization of first and second monomers in the presence of a lanthanide-based catalyst system that includes an aluminoxane cocatalyst. While the first and second monomers are described as 1,3-butadiene and isoprene, other monomers may be employed.

In one or more embodiments, the first and second monomers are selected from conjugated dienes. In one or more embodiments, the conjugated dienes may be selected from 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. The skilled person will appreciate that the sequential monomer feed can be selected from any one or more conjugated diene monomer so long as the sequential feeds are distinct to thereby produce distinct blocks adjacent to each other. In particular embodiments, a high cis-1,4-polydiene block copolymer is produced that includes a block of high cis-1,4-polybutadiene and a block of high cis-1,4-polyisoprene.

In one or more embodiments, the catalyst systems employed include (a) a lanthanide-containing compound, an aluminoxane, an organoaluminum compound, and a halogen-containing compound. In these or other embodiments, other organometallic compounds, Lewis bases, and/or catalyst modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference. In one or more embodiments, the catalyst system is a preformed lanthanide-based catalyst system. In other embodiments, the catalyst system is a lanthanide-based catalyst system formed in situ.

Lanthanide-Containing Compounds

As mentioned above, the lanthanide-based catalyst systems employed in the present invention can include a lanthanide-containing compound. Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl) phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl) phosphonate, neodymium (2-ethylhexyl) (1-methylheptyl) phosphonate, neodymium (2-ethylhexyl) (p-nonylphenyl) phosphonate, and neodymium (p-nonylphenyl) (2-ethylhexyl)phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl) phosphinate, neodymium decylphosphinate, neodymium dodecylphosphinate, neodymium octadecylphosphinate, neodymium oleylphosphinate, neodymium phenylphosphinate, neodymium (p-nonylphenyl) phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl) (2-ethylhexyl)phosphinate, and neodymium (2-ethylhexyl) (p-nonylphenyl) phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing a halogen atom are employed, the lanthanide-containing compound may optionally also provide all or part of the halogen source in the lanthanide-based catalyst system.

As used herein, the term organolanthanide compound refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

Organoaluminum Compounds

As used herein, the term organoaluminum compound refers to any aluminum compound containing at least one aluminum-carbon bond. organoaluminum compounds are capable of functioning as alkylating agents, which can transfer one or more hydrocarbyl groups to another metal. In one or more embodiments, organoaluminum compounds that are soluble in a hydrocarbon solvent can be employed. In one or more embodiments, the catalyst composition may include an additional alkylating separate from the organoaluminum compound. In one or more embodiments, the additional alkylating agent may be an organoaluminum compound. In other embodiments, the additional alkylating agent may be a compound other than an organoaluminum compound. Other suitable alkylating agents include organomagnesium compounds.

As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized in the lanthanide-based catalyst system include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl) aluminum, tricyclohexylaluminum, tris(1-methylcyclopentyl) aluminum, triphenylaluminum, tri-p-tolylaluminum, tris(2,6-dimethylphenyl) aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the lanthanide-based catalyst system is aluminoxanes. Aluminoxanes can comprise oligomeric linear aluminoxanes, which can be represented by the general formula:

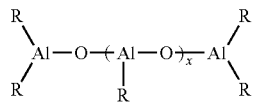

and oligomeric cyclic aluminoxanes, which can be represented by the general formula:

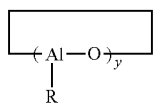

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes. In certain embodiments, a mixture of oligomeric linear aluminoxanes and oligomeric cyclic aluminoxanes may be employed.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane, modified methylaluminoxane, ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 5 to 95 percent of the methyl groups of methylaluminoxane with $C_2$ to $C_{12}$ hydrocarbyl groups, preferably with isobutyl groups, by using techniques known to those skilled in the art.

Organomagnesium Compounds

As mentioned above, alkylating agents useful in the lanthanide-based catalyst system can include organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

Halogen Sources

As mentioned above, the lanthanide-based catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Suitable elemental halogens include, but are not limited to, fluorine, chlorine, bromine, and iodine. Some specific examples of suitable mixed halogens include iodine monochloride, iodine monobromide, iodine trichloride, and iodine pentafluoride.

Suitable hydrogen halides include, but are not limited to, hydrogen fluoride, hydrogen chloride, hydrogen bromide, and hydrogen iodide.

Suitable organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Non-Coordinating Anion/Non-Coordinating Anion Precursor

In one or more embodiments, the lanthanide-based catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

The lanthanide-based catalyst composition used in this invention may be formed by combining or mixing the foregoing catalyst ingredients. Although one or more active catalyst species are believed to result from the combination of the lanthanide-based catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

Specific Catalysts

In one or more embodiments, the catalyst employed in the production of block copolymers is a catalyst that is the combination or reaction product of a lanthanide carboxylate, an aluminoxane, organoaluminum compound defined by the formula $AlR_nX_{3-n}$, where R, X, and n are described above, and an organometallic halide. U.S. Publication No. 2008/0182954, which is incorporated herein by reference in its entirety, provides examples where aluminoxanes and organoaluminum compounds can be employed in combination. In certain embodiments, the catalyst may also include a second organoaluminum compound defined by the formula $AlR_nX_{3-n}$. In specific embodiments, the lanthanide carboxylate is a neodymium carboxylate, the aluminoxane is a oligomeric linear aluminoxane, the organoaluminum compound is a dihydrocarbylaluminum hydride compound, and the organometallic halide is a organoaluminum halide. In these or ether embodiments, where a second organoaluminum compound is employed, the second organoaluminum compound may be a trihydrocarbylaluminum compound. In one or more embodiments, the catalyst system is the combination or reaction product of a neodymium neodecanoate, methylaluminoxane, diethylaluminum chloride, and at least one of diisobutylaluminum hydride, triisobutylaluminum, and trimethylaluminum. In more specific embodiments, the catalyst system is the combination or reaction product of a neodymium neodecanoate, methylaluminoxane, diisobutylaluminum hydride, and diethylaluminum chloride. In other specific embodiments, the catalyst system is the combination or reaction product of a neodymium neodecanoate, methylaluminoxane, diisobutylaluminum hydride, triisobutylaluminum and diethylaluminum chloride.

Amounts

The foregoing lanthanide-based catalyst composition may have high catalytic activity for polymerizing 1,3-butadiene and isoprene into block copolymers over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide-containing compound (alkylating agent/Ln) can be varied from about 1:1 to about 1,000:1, in other embodiments from about 2:1 to about 500:1, and in other embodiments from about 4:1 to about 200:1, and in other embodiments from about 5:1 to about 20:1.

In those embodiments where both an aluminoxane and at least one other organoaluminum agent are employed as alkylating agents, the molar ratio of the aluminoxane to the lanthanide-containing compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide-containing compound (Al/Ln) can be varied from about 1:1 to about 200:1, in other embodiments from about 2:1 to about 150:1, in other embodiments from about 3:1 to about 100:1, and in other embodiments from about 5:1 to about 30:1

The molar ratio of the halogen-containing compound to the lanthanide-containing compound is best described in terms of the ratio of the moles of halogen atoms in the halogen source to the moles of lanthanide atoms in the lanthanide-containing compound (halogen/Ln). In one or more embodiments, the halogen/Ln molar ratio can be varied from about 0.5:1 to about 20:1, in other embodiments from about 1:1 to about 10:1, in other embodiments from about 1.5:1 to about 6:1, and in other embodiments from about 2:1 to about 4:1.

In yet another embodiment, the molar ratio of the non-coordinating anion or non-coordinating anion precursor to the lanthanide-containing compound (An/Ln) may be from about 0.5:1 to about 20:1, in other embodiments from about 0.75:1 to about 10:1, and in other embodiments from about 1:1 to about 6:1.

Preparation of Catalyst System

The catalyst systems employed in the present invention can be formed by various methods.

In one or more embodiments, the lanthanide-based catalyst composition may be formed in situ by adding the catalyst ingredients to a solution containing monomer and solvent, or to bulk monomer, in either a stepwise or simultaneous manner. In one embodiment, the alkylating agent can be added first, followed by the lanthanide-containing compound, and then followed by the halogen source or by the compound containing a non-coordinating anion or the non-coordinating anion precursor.

In one or more embodiments, the lanthanide-based catalyst composition may be preformed. That is, the catalyst ingredients are premixed outside the polymerization system. In one or more embodiments, the premixing of the catalyst ingredients forms an active catalyst system, which is a catalyst system capable of polymerizing monomer, by one or more embodiments of this invention. Examples of useful processes for preforming a lanthanide-based catalyst composition are disclosed in U.S. Pat. Nos. 5,686,371, 6,576,731, U.S. Pat. Publ. No. 2002/0035226, U.S. Pat. Publ. No. 2012/0208964, and U.S. Pat. Publ. No. 2013/0237669, which are incorporated herein by reference.

Order of Addition

In one or more embodiments, the catalyst system may be formed by combining the catalyst ingredients simultaneously or sequentially. Where the ingredients are combined sequentially, the alkylating agent can be first combined with the lanthanide-containing compound, and then the mixture can be combined with the halogen source or the compound containing a non-coordinating anion or the non-coordinating anion precursor. In other embodiments, the alkylating agent and the halogen source (or non-coordinating anion or non-coordinating anion precursor) can first be combined, and then the mixture can be combined with the lanthanide-containing compound. In yet other embodiments, the lanthanide-containing compound and the halogen source (or non-coordinating anion or non-coordinating anion precursor) can first be combined, and then the mixture can be combined with the alkylating agent.

Use of Solvent

In one or more embodiments, the preformation of the catalyst may take place with a solvent. In one or more embodiments, a solvent may be employed as a carrier to either dissolve or suspend the catalyst in order to facilitate the delivery of the catalyst to the polymerization system. In other embodiments, monomer can be used as the carrier. In yet other embodiments, the catalyst can be used in their neat state without any solvent.

In one or more embodiments, suitable solvents include those organic compounds that will not undergo polymerization or incorporation into propagating polymer chains during the polymerization of monomer in the presence of the catalyst or initiator. In one or more embodiments, these organic species are liquid at ambient temperature and pressure. In one or more embodiments, these organic solvents are inert to the catalyst or initiator. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils are noted above, and include paraffinic oils, aromatic oils, naphthenic oils, vegetable oils other than castor oils, and low PCA oils including MES, TDAE, SRAE, heavy naphthenic oils.

In one or more embodiments, the catalyst system may optionally be prepared, for example by preforming the catalyst system, in the presence of a small amount of an alkene containing compound, which may serve to stabilize the catalyst system. Useful alkene containing compounds may include monomer as defined herein. Specific examples of suitable monomers for preforming the catalyst system include conjugated diene monomers such as 1,3-butadiene or isoprene. The amount of alkene containing compound that may be used for preforming the catalyst can range from about 1 to about 100 moles, in other embodiments from about 2.5 to about 50 moles, and in other embodiments from about 5 to about 20 moles per mole of the lanthanide-containing compound.

Conditions for Forming Catalyst System

In one or more embodiments, the catalyst systems used in this invention may be prepared at specific temperatures. In one or more embodiments, the catalyst compositions can be prepared at a temperature of at least −20° C., in other embodiments at least 0° C., in other embodiments at least 20° C., and in other embodiments at least 40° C. In these or other embodiments, the catalyst compositions can be prepared at a temperature of at most 100° C., in other embodiments at most 80° C., in other embodiments at most 60° C., in other embodiments at most 40° C., in other embodiments at most 20° C., and in other embodiments at most 0° C.

Catalyst System Aging

In one or more embodiments, the catalyst composition may be aged prior to use (i.e., prior to being added to the polymerization system).

In one or more embodiments, the catalyst composition may be aged at a temperature of at least −20° C., in other embodiments at least 0° C., in other embodiments at least 20° C., and in other embodiments at least 40° C. In these or other embodiments, the catalyst compositions may be aged at a temperature of at most 100° C., in other embodiments at most 80° C., in other embodiments at most 60° C., in other embodiments at most 40° C., in other embodiments at most 20° C., and in other embodiments at most 0° C. In certain embodiments, the catalyst composition may be aged in an environment without temperature control, where the catalyst composition would potentially be subject to varying environmental temperatures. In these or other embodiments, the catalyst composition may be aged at a temperature as described above and further aged, for at least a portion of the aging time, at an uncontrolled temperature.

In one or more embodiments, the catalyst composition may be aged for at least 1 minute, in other embodiments at least 4 minutes, in other embodiments at least 10 minutes, in other embodiments at least 15 minutes, in other embodiments at least 30 minutes, in other embodiments at least 60 minutes, in other embodiments at least 2 hours, in other embodiments at least 4 hours, and in other embodiments at least 6 hours. In these or other embodiments, the catalyst compositions may be aged for at most 14 days, in other embodiments at most 12 days, in other embodiments at most 10 days, in other embodiments at most 7 days, and in other embodiments at most 4 days, in other embodiments at most 3 days, in other embodiments at most 1 day, and in other embodiments at most 12 hours. In one or more embodiments, the catalyst composition is aged from about 1 minutes to about 14 days, in other embodiments from about 4 minutes to about 12 days, in other embodiments from about 10 minutes to about 10 days, in other embodiments from about 15 minutes to about 7 days, in other embodiments from about 30 minutes to about 4 days, in other embodiments from about 60 minutes to about 3 days, in other embodiments from about 2 hours to about 1 day, and in other embodiments from about 4 hours to about 12 hours.

Polymerization Mixture

As suggested above, the high 1,4-cis block copolymers of polybutadiene and polyisoprene may be prepared by polymerizing a first monomer (either 1,3-butadiene or isoprene) in an amount sufficient to prepare a first polymer segment (i.e. a first block of mer units) of a desired molecular weight in the presence of a catalytically effective amount of the catalyst system. The introduction of the catalyst and the first monomer forms a polymerization mixture, which may also be referred to as a polymerization system, in which a polymer is formed. After the desired amount of first monomer is polymerized, the second monomer (whichever one of 1,3-butadiene or isoprene that is not the first monomer) may be added to the polymerization mixture to prepare the second block or polymer segment.

The amount of the catalyst to be employed may depend on the interplay of various factors such as the type of catalyst or initiator employed, the purity of the ingredients, the polymerization temperature, the polymerization rate and conversion desired, the molecular weight desired, and many other factors. Accordingly, a specific catalyst amount cannot be definitively set forth except to say that catalytically effective amounts of the catalyst may be used.

In one or more embodiments, second monomer may be added to the polymerization mixture after a substantial portion of the first monomer has been polymerized. In one or more embodiments, the second monomer may be added to the polymerization mixture after 80% of the first monomer has polymerized, in other embodiments after 90% of the first monomer has polymerized, in other embodiments after 95% of the first monomer has polymerized, and in other embodiments after 99% of the first monomer has polymerized. In one or more embodiments, the second monomer may be added to the polymerization mixture after substantially all of the first monomer has been polymerized. In other embodiments, the second monomer may be added to the polymerization mixture after all of the first monomer has been polymerized.

The amount of lanthanide-containing compound used (i.e. present during polymerization) may be described with reference to the weight of monomer present during the polymerization of any given monomer feed. In one or more embodiments, the amount of the lanthanide-containing compound used can be varied from about 0.0008 to about 1.6 mmol, in other embodiments from about 0.004 to about 0.8 mmol, and in still other embodiments from about 0.008 to about 0.16 mmol of lanthanide-containing compound per 100 gram of the first monomer.

Likewise, the amount of the lanthanide-containing compound used can be varied from about 0.0008 to about 1.6 mmol, in other embodiments from about 0.004 to about 0.8 mmol, and in still other embodiments from about 0.008 to about 0.16 mmol of lanthanide-containing compound per 100 gram of the second monomer.

In other embodiments, the amount of lanthanide-containing compound used may be described with reference to the weight of total monomer to be polymerized during the entire reaction. In one or more embodiments, the amount of the lanthanide-containing compound used can be varied from about 0.001 to about 2 mmol, in other embodiments from about 0.005 to about 1 mmol, and in still other embodiments from about 0.01 to about 0.2 mmol per 100 gram of the total monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst or initiator is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel (with the understanding that the second monomer is sequentially added). In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Pseudo-Living Polymer

Polymerization catalyzed by the lanthanide-based catalyst produces polymer segments and copolymers where some or all of the resulting polymer chains may possess reactive chain ends before the polymerization mixture is quenched. Thus, reference to a reactive polymer refers to a polymer chain or copolymer having a reactive chain end. The reactive polymer prepared with a lanthanide-based catalyst may be referred to as a pseudo-living polymer. In one or more embodiments, a polymerization mixture including reactive polymer may be referred to as an active polymerization mixture or active polymerization system. The percentage of polymer chains possessing a reactive end depends on various factors such as the type of catalyst or initiator, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end.

End-Functionalization Reaction

In one or more embodiments, the pseudo-living polymer (i.e. the block copolymer), which includes a reactive chain end, may optionally be end functionalized by reacting the reactive chain end with a functionalizing agent.

In one or more embodiments, the functionalizing agent can be reacted with the reactive polymer after a desired conversion of the second monomer (or whatever monomer forms the terminal block) is achieved but before the polymerization mixture is quenched by a quenching agent. In one or more embodiments, the reaction between the functionalizing agent and the reactive polymer may take place within 2 hours, in other embodiments within 1 hour, in other embodiments within 30 minutes, in other embodiments within 5 minutes, and in other embodiments within one minute after the peak polymerization temperature is reached. In one or more embodiments, the reaction between the functionalizing agent and the reactive polymer can occur once the peak polymerization temperature is reached. In other embodiments, the reaction between the functionalizing agent and the reactive polymer can occur after the reactive polymer has been stored. In one or more embodiments, the storage of the reactive polymer occurs at room temperature or below room temperature under an inert atmosphere.

The time required for completing the reaction between the functionalizing agent and the reactive polymer depends on various factors such as the type and amount of the catalyst used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

In one or more embodiments, the functionalizing agent may be introduced to the polymerization mixture at a location (e.g., within a vessel) where the polymerization has been conducted. In other embodiments, the functionalizing agent may be introduced to the polymerization mixture at a location that is distinct from where the polymerization has taken place. For example, the functionalizing agent may be introduced to the polymerization mixture in downstream vessels including downstream reactors or tanks, in-line reactors or mixers, extruders, or devolatilizers.

Functionalizing Agents

In one or more embodiments, suitable functionalizing agents include those compounds that contain groups that may react with a pseudo-living polymer.

Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Pat. No. 7,879,952, hydrobenzamide compounds as disclosed in U.S. Pat. No. 7,671,138, nitro compounds as disclosed in U.S. Pat. No. 7,732,534, protected oxime compounds as disclosed in U.S. Pat. No. 8,088,868, heterocyclic nitrile compounds disclosed in U.S. Pat. No. 8,314,189, halosilanes containing an amino group disclosed in U.S. Pat. No. 8,258,332, imide compounds containing a protected amino group disclosed in U.S. Pat. No. 7,906,592, nitroso compounds disclosed in U.S. Pat. Pub. No. 2010/0168378, amide containing compounds disclosed in U.S. Pat. Pub. No. 2010/0099826, carboxylic or thiocarboxylic esters containing a silylated amino group disclosed in U.S. Pat. Pub. No. 2011/0077325, polyoxime compounds disclosed in U.S. Pat. Publ. No. 2011/0152449, polycyano compounds disclosed in U.S. Pat. Pub. No. 2011/0288200, nitrile compounds containing a protected amino group disclosed in U.S. Pat. Pub. No. 2012/0059112 all of which are incorporated herein by reference.

The amount of the functionalizing agent that can be added to the polymerization mixture to yield a functionalized polymer may depend on various factors including the type and amount of catalyst used to synthesize the reactive polymer and the desired degree of functionalization. In one or more embodiments, where the reactive polymer is prepared by employing a lanthanide-based catalyst, the amount of functionalizing agent employed can be described with reference to the lanthanide metal of the lanthanide-containing compound. For example, the molar ratio of the functionalizing agent to the lanthanide metal may be from about 1:1 to about 80:1, in other embodiments from about 5:1 to about 40:1, and in other embodiments from about 10:1 to about 25:1.

Polymer Recovery

Once the polymerization mixture has been quenched, the various constituents of the polymerization mixture (including the block copolymer) may be recovered and/or separated. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The block copolymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. In another method, the polymer can also be recovered by subjecting the polymerization mixture to a polar solvent, such as isopropyl alcohol, followed by drying the resulting coagulated polymer on a drum dryer. The polymer can also be recovered by directly drying the polymerization mixture on a drum dryer.

In order to demonstrate the practice of the present invention, the following examples have been prepared and tested. The examples should not, however, be viewed as limiting the scope of the invention. The claims will serve to define the invention.

EXAMPLES

Anhydrous toluene was purchased from Aldrich and used without further purification. Butadiene (>99%) was distilled, dried with CDX-XP beads (BASF), and combined with anhydrous hexanes to afford a 21.0% by wt. solution of butadiene. Isoprene (>99%) was obtained from Aldrich and dried by passage over activated alumina beads. Methylaluminoxane, modified methylaluminoxane (5% octylaluminoxane), trimethylaluminum triisobutylaluminum, diisobutylaluminum hydride, and diethylaluminum chloride were obtained as solutions from Aldrich or Albemarle and used without further purification. The number average (Mn) and weight average (Mw) molecular weights of the polymer samples were determined by gel permeation chromatography (GPC) using a Tosoh Ecosec HLC-8320GPC system and Tosoh TSKgel GMHxl-BS columns with THF as a solvent. The system was calibrated using a series of polystyrene standards (K=0.0001249, alpha=0.72). The Mooney viscosity ($ML_{1+4}$) of the polymers were determined at 100° C. by using an Alpha Technologies Money viscometer with a large rotor, a one-minute warm-up time, and a four-minute running time. The BR/IR ratio, cis-1,4-linkage, trans-1,4-linkage, and vinyl-linkage contents of the polymer samples were determined by integrating characteristic peaks in $^1$H and $^{13}$C NMR spectroscopy using CDCl$_3$ as a solvent and either a Varian Mercury 300 MHz, a Varian Mercury 400 MHz, or a Varian Inova 500 MHz.

Example 1.1

Catalyst Preparation

A small N$_2$ purged sealed glass vessel was charged with 27.1 mL of a 2.81 M solution of methylaluminoxane in toluene and 5.86 mL of a 21.3% wt. solution of butadiene in hexanes. To this mixture was added 1.47 mL of a 0.518 M solution of neodymium versatate in hexanes, rapidly followed by 11.3 mL of a 1.01 M solution of triisobutylaluminum in hexanes and 3.77 mL of a 1.01 M solution of diisobutylaluminum hydride. The mixture was vigorously shaken and allowed to age at 23° C. for 2 minutes. To this mixture was added 2.85 mL of a 1.07 M solution of diethylaluminum chloride in hexanes. After this mixture was aged at 23° C. for 14 minutes it was charged to a reactor containing butadiene monomer in hexanes.

Polymerization

A 5-gallon reactor was charged with 7.04 kg of hexanes followed by 2.86 kg of a 21.30% wt. solution of butadiene in hexanes. The aged catalyst described above was charged to this mixture and the reactor jacket was set to heat at 65.5° C. After 30 minutes from the catalyst charge, 0.91 kg of isoprene was charged to the reactor. After 60 minutes from the isoprene charge, the polymerization cement was allowed to cool for 20 minutes and then discharged and coagulated in a container with 16 L isopropyl alcohol and 30 g of 2,6-di-tert-butyl-4-methylphenol. For polymer characterization data, see Table 1.

Example 1.2

Catalyst Preparation

A small N$_2$ purged sealed glass vessel was charged with 12.00 mL of a 1.96 M solution of methylaluminoxane in toluene and 1.84 mL of a 21.0% wt. solution of butadiene in hexanes. To this mixture was added 0.45 mL of a 0.518 M solution of neodymium versatate in hexanes, rapidly followed by 4.66 mL of a 1.01 M solution of triisobutylaluminum in hexanes and 1.16 mL of a 1.01 M solution of diisobutylaluminum hydride. The mixture was vigorously shaken and allowed to age at 23° C. for 2 minutes. To this mixture was added 0.88 mL of a 1.07 M solution of diethylaluminum chloride in hexanes. After this mixture was aged at 23° C. for 14 minutes, the active catalyst mixture was diluted with 21.0 mL of toluene and then added to monomer solutions.

Polymerization

Ten N$_2$ purged sealed glass vessels were each charged with 181.8 g of hexanes followed by 74.7 g of a 21.0% wt. solution of butadiene in hexanes. To each vessel was added 3.50 mL of the active catalyst mixture described above. The vessels were then immediately placed in an agitating bath at 65 C. After 30 minutes of agitation, 34.5 mL of isoprene was added to each of the polymerization mixtures. After an additional 60 minutes of agitation at 65 C, the polymerization was terminated by addition of 4 mL of isopropyl alcohol containing 0.46 g of 2,6-di-tert-butyl-4-methylphenol. The polymer cement was combined and coagulated in 8 L isopropyl alcohol containing 15 g of 2,6-di-tert-butyl-4-methylphenol and then drum dried. For polymer characterization data, see Table 1.

TABLE 1

BR-b-IR Block Copolymerization Characterization

| | Example 1.1 | Example 1.2 |
|---|---|---|
| Butadiene (g) | 610 | 156.80 |
| Isoprene (g) | 914 | 235.20 |
| Hexanes (g) | 9360 | 1818.13 |
| Nd phg Total Monomer (mmol) | 0.05 | 0.05 |
| Polymerization Time (Butadiene) | 30 min | 30 min |
| Polymerization Time (Isoprene) | 60 min | 60 min |
| Polymerization Temperature (° C.) | 65.5 | 65 |
| % Conversion | 85% | 100% |
| ML$_{1+4}$ | 67.90 | 58.80 |
| t$_{80}$ | 6.48 | 5.03 |
| Mn (×10$^3$) (g/mol) | 409 | 366 |
| Mw (×10$^3$) (g/mol) | 1199 | 797 |
| Mw/Mn | 2.93 | 2.18 |
| BR/IR ratio | 39/61 | 40/60 |
| % 1,4-Cis BR | 97.7% | 96.0% |
| % 1,4-Trans BR | 1.5% | 3.5% |
| % Vinyl BR | 0.8% | 0.5% |
| % 1,4-Cis IR | 96.7% | 96.7% |
| % 1,4-Trans IR | <0.2% | 0.5% |
| % 3,4-Vinyl IR | 3.3% | 2.8% |
| t$_{g1}$ (° C.) | −107.04 | −106.22 |
| t$_{g2}$ (° C.) | −64.06 | −64.31 |

*Molecular weights determined by gpc and are referenced to polystyrene standards. Microstructure and BR/IR ratio determined by $^{13}$C NMR. Conversion based upon isolated yield.

Example 1.3

Catalyst Preparation

A large N$_2$ purged sealed glass vessel was charged with 181 mL of a 1.12 M solution of modified methylaluminoxane (5% octylaluminoxane) in toluene, 20.5 mL of a 1.98 M solution of trimethylaluminum in hexanes, and 15.9 mL of a 20.9% wt. solution of butadiene in hexanes. To this mixture was added 3.92 mL of a 0.518 M solution of neodymium versatate in hexanes, rapidly followed by 19.5 mL of a 1.04 M solution of diisobutylaluminum hydride. The mixture was vigorously shaken and allowed to age at 23° C. for 2 minutes. To this mixture was added 5.6 mL of a 1.08 M solution of diethylaluminum chloride in hexanes. After this mixture was aged at 23° C. for 14 minutes it was charged to a reactor containing butadiene monomer in hexanes.

Polymerization

A 20-gallon reactor was charged with 14.5 kg of hexanes followed by 9.45 kg of a 21.50% wt. solution of butadiene in hexanes. The aged catalyst described above was charged to this mixture and the reactor jacket was set to heat at 65.5° C. After 30 minutes from the catalyst charge, a solution of 3.05 kg of isoprene in 9.14 kg of hexanes was charged to the reactor. After 60 minutes from the isoprene solution charge, the polymerization cement was allowed to cool for 2.5 hours and then quenched by charging the reactor with 500 mL of a 25% v/v solution of tert-butanol in hexanes. The resulting cement was transferred to a holding cylinder containing 10.2 g of Irganox-1076 and 30.5 g of tris(nonylphenyl)phosphite. Samples from the holding cylinder were collected, coagulated with 16 L isopropyl alcohol containing 30 g of 2,6-di-tert-butyl-4-methylphenol, and analyzed. For polymer characterization data, see Table 2.

TABLE 2

BR-b-IR Block Copolymerization Characterization

| | Example 1.3 |
|---|---|
| Butadiene (kg) | 2.03 |
| Isoprene (kg) | 3.05 |
| Hexanes (kg) | 31.21 |
| Nd phg Total Monomer (mmol) | 0.04 |
| Polymerization Time (Butadiene) | 30 min |
| Polymerization Time (Isoprene) | 60 min |
| Polymerization Temperature (° C.) | 65.5 |
| % Conversion | 98% |
| $ML_{1+4}$ | 67.38 |
| $t_{80}$ | 6.30 |
| Mn (×10$^3$) (g/mol) | 398 |
| Mw (×10$^3$) (g/mol) | 844 |
| Mw/Mn | 2.12 |
| BR/IR ratio | 41/59 |

*Molecular weights determined by gpc and are referenced to polystyrene standards. BR/IR ratio determined by $^1$H NMR. Conversion based upon GC analysis of remaining monomer content.

We evaluated the BR-b-IR copolymer prepared in Example 1.1 in an unfilled formulation as is shown in Table 3. Block ratio of BR to IR was 40/60. The block copolymer was compared with a control blend of natural rubber (NR) and low cis anionic BR (Example 2.1, 37% cis, Mn: 322 kg/mol) and another control blend of NR and high cis BR (Example 2.3, 97% cis, Mn: 189 kg/mol). Compounds were cured for 35 minutes at 145° C. for preparation of physical property specimens. The results are summarized in Table 4. The block copolymer showed 180% to 235% lower hysteresis compared to the blend of NR/low cis BR and 40%-65% lower hysteresis compared to the blend of NR/high cis BR. Wear resistance of the block copolymer measured by PICO Abrader was 30% better than the blend of NR/low cis BR and 8% better than the blend of NR/high cis BR.

TABLE 3

Samples, formulations, and mix steps.

| | Example | | |
|---|---|---|---|
| | 2.1 | 2.2 | 2.3 |
| Masterbatch Mixing: Initial T 125° C., RPM 60, Mixing for 5 min | | | |
| NR | 60 | | 60 |
| Anionic low cis BR | 40 | | |
| Nd high cis BR | | | 40 |
| BR-b-IR (ex. 1.1) | | 100 | |
| Stearic Acid/Resin/Wax/N-(1,3-Dimethylbutyl)-N'-phenyl-p-phenylenediamine | | 2/1/1.5/2 | |
| Final Mixing: Initial T 80° C., RPM 50, Mixing for 2.5 min Masterbatch/ZnO/1,2-Dihydro-2,2,4-trimethylquinoline/N-Cyclohexyl-2-benzothiazole sulfenamide/sulfur: 106.5/3.5/0.35/1/1 | | | |

TABLE 4

Physical Properties

| | Example | | |
|---|---|---|---|
| | 2.1 | 2.2 | 2.3 |
| Strain sweep @60° C., 10 Hz Tanδ @ 10% (Index) | 100 | 179 | 128 |
| Temperature sweep, 10 Hz Tanδ @ 60° C., 2% | 100 | 237 | 143 |
| PICO Abrasion Wear Rate (Index) | 100 | 129 | 119 |

We evaluated the BR-b-IR copolymer prepared in Example 1.2 in a carbon black filled formulation as is shown in Table 5. Block ratio of BR to IR was 40/60. The block copolymer was compared with a control blend of NR and high cis BR (97% cis, Mn: 189 kg/mol) of the same composition. Same formulations were mixed three times but at different fill factors. Compounds were cured for 21 minutes at 145° C. for preparation of physical property specimens. The results are summarized in Table 6. There is some variation in the wear data between the different sets of samples for different fill factors. However, there is no statistically meaningful difference between the wear data of the NR/cis BR blends and those of the block copolymer with the 95% confidence interval. However, the hysteresis of the block copolymer compounds was lower by 10-20% compared to each corresponding control compound. On average of the three data of the same composition, the block copolymer showed 17% lower hysteresis than the NR/cis BR blends, which is statistically meaningful.

TABLE 5

Samples, formulations, and mix steps.

| | Example | | | | | |
|---|---|---|---|---|---|---|
| | 3.1 | 3.2 | 3.3 | 3.4 | 3.5 | 3.6 |
| A. Masterbatch Mixing | | | | | | |
| NR | 60 | | 60 | | 60 | |
| Nd high cis BR | 40 | | 40 | | 40 | |
| BR-b-IR (Ex. 1.2) | | 100 | | 100 | | 100 |
| Carbon Black | 50 | 50 | 50 | 50 | 50 | 50 |
| Oil/Stearic Acid/Wax/N-(1,3-Dimethylbutyl)-N'-phenyl-p-phenylenediamine | | | 10/2/2/0.95 | | | |
| B. Productive Mixing | | | | | | |
| Final | Masterbatch/sulfur/dibenzothiazole disulfide/diphenyl guanidine/ N-Cyclohexyl-2-benzothiazole sulfenamide/ZnO = 164.95/1/0.1/0.3/0.4/2.5 | | | | | |
| Fill Factor | 72% | 72% | 77% | 77% | 82% | 82% |

TABLE 6

Physical Properties

| | Example | | | | | |
|---|---|---|---|---|---|---|
| | 3.1 | 3.2 | 3.3 | 3.4 | 3.5 | 3.6 |
| Lambourn Wear (Index) | 100 | 94 | 100 | 99 | 100 | 98 |
| Stdev (%) | 10 | 10 | 11 | 4 | 9 | 6 |
| Tanδ @ 10%, 60° C., 10 Hz (Index) | 100 | 119 | 100 | 122 | 100 | 110 |

We evaluated the BR-b-IR copolymer prepared in Example 1.2 in a carbon black filled formulation as is shown in Table 7. Block ratio of BR to IR was 40/60. The block copolymer was compared with a control blend of NR and high cis BR (97% cis, Mn: 189 kg/mol) of the same composition. Compounds were cured for 25 minutes at 145° C. for preparation of physical property specimens. The results are summarized in Table 8. The wear properties were measured by using a torque controlled wear tester and the wear rate was calculated with the consideration of historical data of TBR tire operation severity. The results also show that the wear resistance of the block copolymer was comparable to that of the NR/cis BR blend. But, the block copolymer demonstrated significantly lower hysteresis.

TABLE 7

Samples, formulations, and mix steps.

|  | Example | |
| --- | --- | --- |
|  | 4.1 | 4.2 |
| A Masterbatch Mixing | | |
| NR | 60 | |
| Nd high cis BR | 40 | |
| BR-b-IR (Ex. 1.2) | | 100 |
| Carbon black | 50 | 50 |
| Oil/Stearic Acid/Wax/N-(1,3-Dimethylbutyl)-N'-phenyl-p-phenylenediamine | 10/2.5/2/0.95 | |
| B. Productive Mixing | | |
| Final | Masterbatch/sulfur/dibenzothiazole disulfide/diphenyl guanidine/ N-Cyclohexyl-2-benzothiazole sulfenamide/ ZnO = 165.45/1/0.1/0.3/0.4/2.5 | |

TABLE 8

Physical properties.

|  | Example | |
| --- | --- | --- |
|  | 4.1 | 4.2 |
| Torque Controlled Wear (Index) | 100 | 99 |
| Strain Sweep, 60° C., 10 Hz | | |
| Tanδ @ 5% | 100 | 111 |
| Tanδ @ 10% | 100 | 112 |

We evaluated the BR-b-IR copolymer prepared in Example 1.3 in a carbon black filled formulation as is shown in Table 9. Block ratio of BR to IR was 40/60. The block copolymer was compared with a control blend of NR and a choice of BR from Ni high cis BR (Example 5.1, cis 96%, Mn: 107 kg/mol) and anionic low cis BR (Example 5.2, cis 38%, Mn: 160 kg/mol). The compounds were mixed in two stages. The wear properties were measured by using a torque controlled wear tester and the wear rate was calculated with the consideration of historical data of TBR tire operation severity. The results show that the wear resistance of the block copolymer compound was 5% to 7% lower than those of the control blend compounds. However, significant reduction in hysteresis was achieved by using the block copolymer in place of a blend of homopolymers of NR and BR. The results are summarized in Table 10.

TABLE 9

Samples, formulations, and mix steps.

|  | Example | | |
| --- | --- | --- | --- |
|  | 5.1 | 5.2 | 5.3 |
| A Masterbatch Mixing | | | |
| NR | 60 | 60 | |
| Ni high cis BR | 40 | | |
| Anionic loc cis BR | | 40 | |
| BR-b-IR (Ex. 1.3) | | | 100 |
| Carbon Black | 45 | 45 | 45 |
| Stearic Acid/Wax/ N-(1,3-Dimethylbutyl)-N'-phenyl-p-phenylenediamine | | 2/2/0.95 | |
| B. Productive Mixing | | | |
| Final | Masterbatch/sulfur/N-tert-butyl-benzothiazole sulfonamide/dibenzothiazole disulfide/diphenyl guanidine/ZnO = 149.95/1.5/0.5/0.5/0.3/2.5 | | |

TABLE 10

Physical properties.

|  | Example | | |
| --- | --- | --- | --- |
|  | 5.1 | 5.2 | 5.3 |
| Torque Controlled Wear (Index) | 100 | 97 | 93 |
| Temperature sweep Tanδ @ 60° C., 1.9%, 10 Hz (Index) | 100 | 98 | 152 |
| Strain sweep Tanδ @ 10%, 60° C., 10 Hz (Index) | 100 | 97 | 116 |

Various modifications and alterations that do not depart from the scope and spirit of this invention will become apparent to those skilled in the art. This invention is not to be duly limited to the illustrative embodiments set forth herein.

What is claimed is:

1. A method of preparing a high 1,4-cis block copolymers of polybutadiene and polyisoprene comprising:
   (i) forming a polymerization mixture that includes a pseudo-living polymer by combining a first monomer and a lanthanide-based catalyst, where the lanthanide-based catalyst comprises
      (a) a lanthanide-containing compound,
      (b) an aluminoxane,
      (c) an organoaluminum compound defined by the formula $AlR_nX_{3-n}$, where each R is individually a hydrocarbon group or a substituted hydrocarbon group, each X is individually a hydrogen atom, a carboxylate group, an alkoxide group, or an aryloxide group, and where n is an integer of 1 to 3, and
      (d) a halogen-containing compound;
   (ii) adding a second monomer to the polymerization mixture that includes a pseudo-living polybutadiene polymer, and where the first monomer is either 1,3-butadiene or isoprene and where the second monomer is not the same as the first monomer and is either 1,3-butadiene or isoprene.

2. The method of claim 1, where the lanthanide-based catalyst is a preformed catalyst.

3. The method of claim 2, where the lanthanide-based catalyst is preformed in the presence of a stabilizer.

4. The method of claim 3, where the stabilizer is 1,3-butadiene.

5. The method of claim 1, where the organoaluminum compound is a first organoaluminum compound and the lanthanide-based catalyst further comprises a second organoaluminum compound defined by the formula $AlR_nX_{3-n}$, where each R is individually a hydrocarbon group or a substituted hydrocarbon group, each X is individually a hydrogen atom, a carboxylate group, an alkoxide group, or an aryloxide group, and where n is an integer of 1 to 3.

6. The method of claim 5, where the first organoaluminum compound is a dihydrocarbylaluminum hydride compound.

7. The method of claim 5, where the second organoaluminum compound is a trihydrocarbylaluminum compound.

8. The method of claim 5, where the lanthanide-containing compound is a lanthanide carboxylate.

9. The method of claim 5, where the halogen-containing compound is an organometallic halide.

10. The method of claim 5, where the aluminoxane compound is an oligomeric linear aluminoxane.

11. The method of claim 10, where the oligomeric linear aluminoxane is defined by the formula

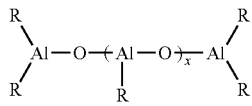

where x is from 1 to about 100, and where each R is independently a monovalent organic group that is attached to the aluminum atom via a carbon atom.

12. The method of claim 1, where the step of adding the second monomer to the polymerization mixture that includes a pseudo-living polymer is performed after a substantial portion of the first monomer has polymerized.

13. The method of claim 1, where the step of adding the second monomer to the polymerization mixture that includes a pseudo-living polymer is preformed after 90% of the first monomer has polymerized.

14. The method of claim 1, where the method further comprise the step of adding an additional amount of the first monomer after the second monomer is substantially polymerized.

15. The method of claim 1, where the resultant block copolymer has number average molecular weight of about 1,000 g/mol to about 1,200,000 g/mol.

16. The method of claim 1, where the resultant block copolymer has number average molecular weight about 10,000 g/mol to about 1,000,000 g/mol.

17. The method of claim 1, where the resultant block copolymer block copolymer has number average molecular weight 150,000 g/mol to about 800,000 g/mol.

18. The method of claim 1, where the resultant block copolymer block copolymer has a ratio of polybutadiene to polyisoprene from about 90:10 to about 10:90.

19. The method of claim 1, where the resultant block copolymer has a cis content of at least 90%.

20. The method of claim 1, where the first monomer is 1,3-butadiene and the second monomer is isoprene.

21. The method of claim 1, where the first monomer is isoprene and the second monomer is 1,3-butadiene.

22. A method of preparing a high 1,4-cis block copolymer of polybutadiene and polyisoprene comprising:
(i) polymerizing 1,3-butadiene with a lanthanide-based catalyst to form a pseudo-living polymer, where the lanthanide-based catalyst comprises
(a) a lanthanide-containing compound,
(b) an aluminoxane,
(c) an organoaluminum compound defined by the formula $AlR_nX_{3-n}$, where each R is individually a hydrocarbon group or a substituted hydrocarbon group, each X is individually a hydrogen atom, a carboxylate group, an alkoxide group, or an aryloxide group, and where n is an integer of 1 to 3, and
(d) a halogen-containing compound;
(ii) reacting the pseudo-living polymer with isoprene.

* * * * *